Figure 1:
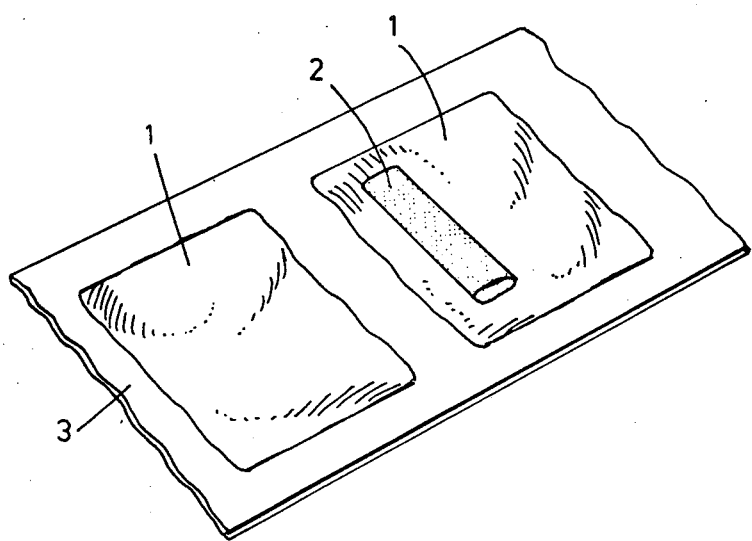

United States Patent [19]

Schrauf

[11] Patent Number: 4,469,709

[45] Date of Patent: Sep. 4, 1984

[54] METHOD FOR AUTOMATICALLY FEEDING FIRST PRODUCTS ONTO SECOND PRODUCTS

[75] Inventor: Karl Schrauf, Vorarlberg, Austria

[73] Assignee: Seewer AG, Maschinenfabrik, Bern, Switzerland

[21] Appl. No.: 354,593

[22] Filed: Mar. 4, 1982

[30] Foreign Application Priority Data

Mar. 12, 1981 European Pat. Off. .............. 81810091.9

[51] Int. Cl.³ .................. B23Q 7/12; B65H 9/00
[52] U.S. Cl. .......................... 426/231; 426/274; 426/275; 426/282; 426/283; 426/297; 198/396; 221/156; 221/163; 221/168; 221/157; 221/178; 221/180; 221/298; 221/167; 53/236; 53/505; 99/450.1; 99/450.4; 99/450.7
[58] Field of Search ............... 221/298, 163, 167, 168, 221/156, 157, 178, 180, 182, 183, 175; 198/396; 53/505, 506, 236; 99/450.1, 450.2, 450.4, 450.6, 450.7; 426/274, 275, 282, 283, 297, 231

[56] References Cited

U.S. PATENT DOCUMENTS

| | | |
|---|---|---|
| 1,445,296 | 2/1923 | Clark .................. 221/157 |
| 2,413,047 | 12/1946 | Huddleson et al. ........ 221/163 |
| 2,497,371 | 2/1950 | Poister ................ 221/178 |
| 2,664,330 | 12/1953 | Schupp ................ 221/178 |
| 2,786,566 | 3/1957 | Taggart et al. ......... 221/168 |
| 3,307,742 | 3/1967 | Astrom ................ 221/180 |
| 3,545,164 | 12/1970 | Middleton ............. 221/156 |
| 3,669,007 | 6/1972 | Pulici ................ 99/450.6 |
| 3,775,941 | 12/1973 | Bross ................. 221/298 |
| 3,912,433 | 10/1975 | Ma .................... 99/450.6 |
| 3,930,440 | 1/1976 | Ohkawa ................ 99/450.6 |
| 3,946,656 | 3/1976 | Hon Hai ............... 99/450.6 |
| 4,020,615 | 5/1977 | Irvine et al. ......... 53/505 |
| 4,047,478 | 9/1977 | Trostman et al. ....... 99/450.1 |
| 4,055,932 | 11/1977 | Wanner ................ 53/505 |
| 4,084,493 | 4/1978 | Quintana .............. 99/450.7 |
| 4,114,524 | 9/1978 | Welch ................. 99/450.4 |
| 4,119,243 | 10/1978 | Maracek et al. ........ 221/298 |
| 4,199,911 | 4/1980 | Miyaraki .............. 53/505 |
| 4,249,388 | 2/1981 | Burns ................. 53/505 |
| 4,306,649 | 12/1981 | Berge ................. 221/298 |
| 4,312,172 | 1/1982 | Fisher et al. ......... 53/505 |

FOREIGN PATENT DOCUMENTS

| | | |
|---|---|---|
| 207209 | 11/1955 | Austria ............... 221/178 |
| 230248 | 3/1963 | Austria ............... 221/178 |
| 1190378 | 9/1960 | Fed. Rep. of Germany ... 221/180 |
| 1335929 | 10/1962 | France ................ 221/180 |
| 644371 | 9/1962 | Italy ................. 99/450.7 |
| 180511 | 8/1962 | Sweden ................ 221/178 |
| 1141658 | 1/1969 | United Kingdom ........ 221/178 |

Primary Examiner—Steven L. Weinstein
Attorney, Agent, or Firm—Salter & Michaelson

[57] ABSTRACT

Products such as small chocolate bars, intended to be uniformly aligned on other products passing on a conveyor, such as pieces of dough in the manufacture of chocolate-filled cookies, are placed in a hopper having resiliently mounted walls. Beneath the hopper is a feeder comprising a cylindrical-sector-shaped feeder part. The feeder part includes a slot through which the chocolate bars can be disposed on the pieces of dough. By means of a motor-driven main crank assembly and a supplementary crank assembly, a perturbed sinusoidal motion is imparted to the feeder part, thus ensuring that the chocolate bars are consistently introduced into the feed slot, particularly in the vicinity of the walls of the hopper. A blocking and release mechanism, connected to the feeder and controlled by a sensor unit, ensures that only one chocolate bar drops on each piece of dough.

7 Claims, 8 Drawing Figures

METHOD FOR AUTOMATICALLY FEEDING FIRST PRODUCTS ONTO SECOND PRODUCTS

This invention relates to feeding systems and more particularly to a feeding device and method of the type intended for automatically positioning first products, such as small bars of chocolate, on second products, such as flat pieces of dough, carried by conveyor means.

In the manufacture of the French delicacy known as "pain au chocolat," which consists of chocolate-filled bread-rolls, the small bars of chocolate used have heretofore been placed by hand on each square of rolled-out dough. This method is very time- and labor-consuming. It is not suitable to apply fluid chocolate since the filling may then leak out of the envelope of dough during baking.

It is an object of this invention to provide an improved device and method whereby a first product, e.g., a small bar of chocolate, can be automatically and reliably positioned in a certain alignment on each second product, e.g., a flat piece of dough, as it travels by.

A further object of this invention is to provide such a device in which the first products, e.g., the chocolate bars, are protected from damage in their feeder receptacle.

To this end, in the device according to the present invention, of the type initially mentioned, the improvement comprises a receptacle for holding the first products, feeder means disposed beneath the receptacle, forming the bottom thereof, and provided with a feed opening, and drive means for setting the feeder means in rotational motion. The walls of the receptacle may be mounted resiliently.

In the method according to the present invention, the first products are conveyed to the receptacle above the feeder means, the feeder means is set in motion so that the feed opening is moved back and forth between the walls of the receptacle, and the first products are thereby conveyed from the receptacle onto the second products through the feed opening.

Figure 2:
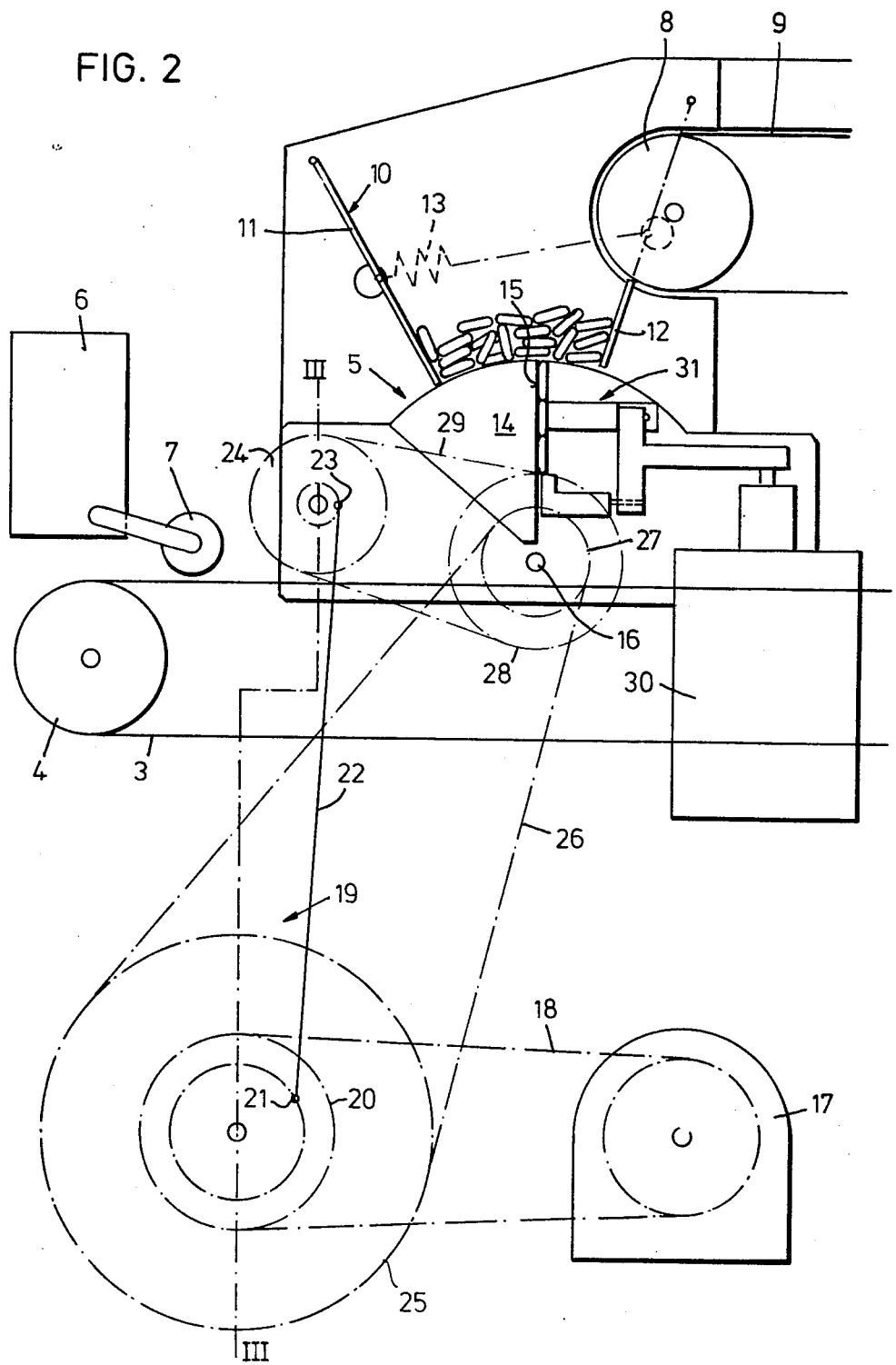
Figure 3:
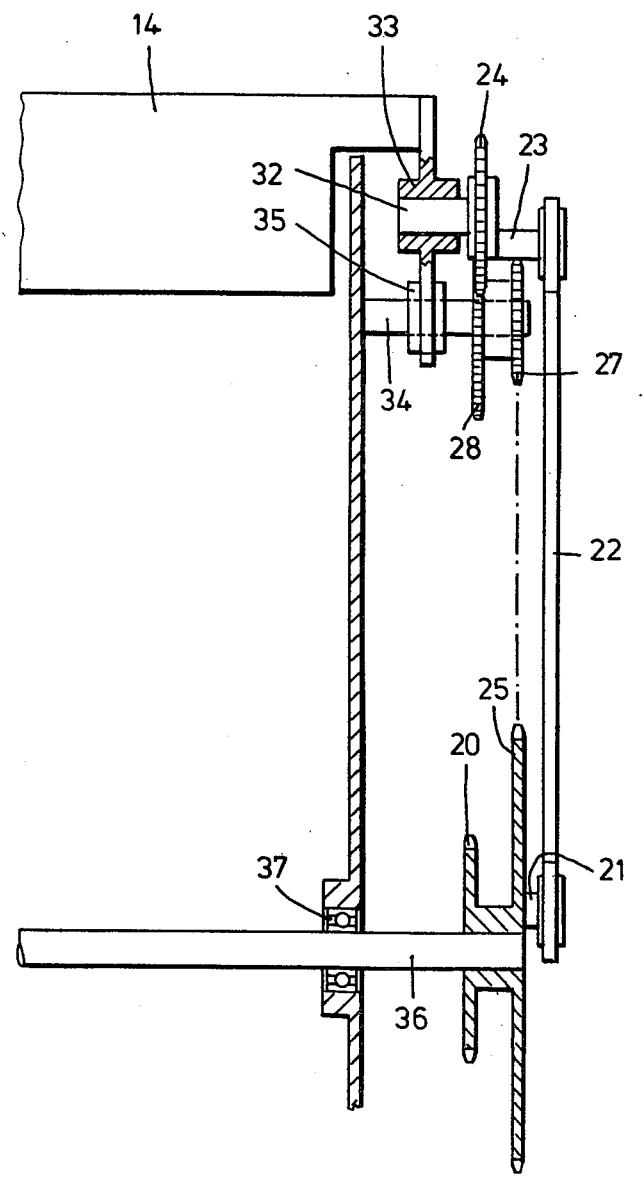
Figure 4:
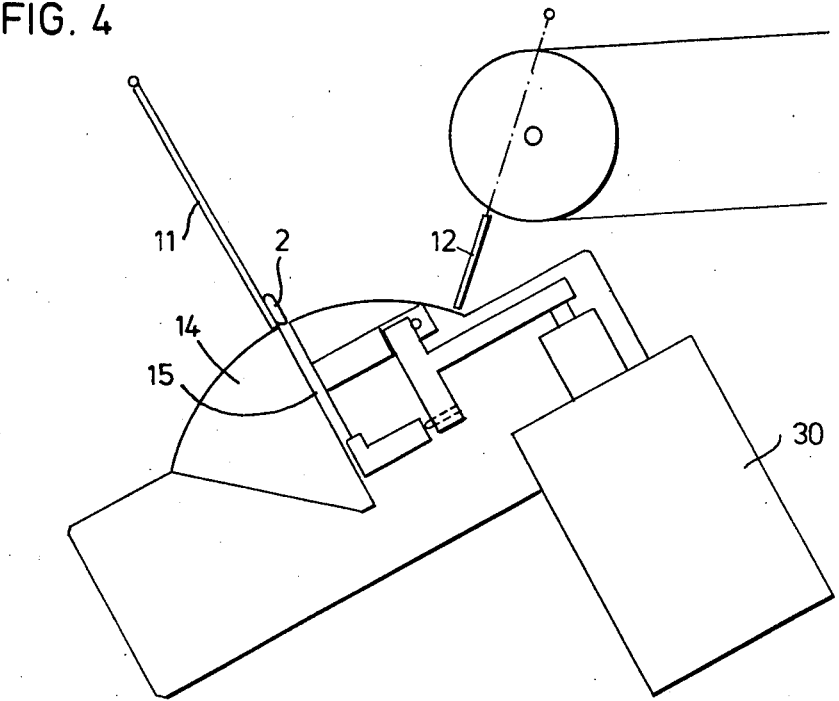
Figure 5:
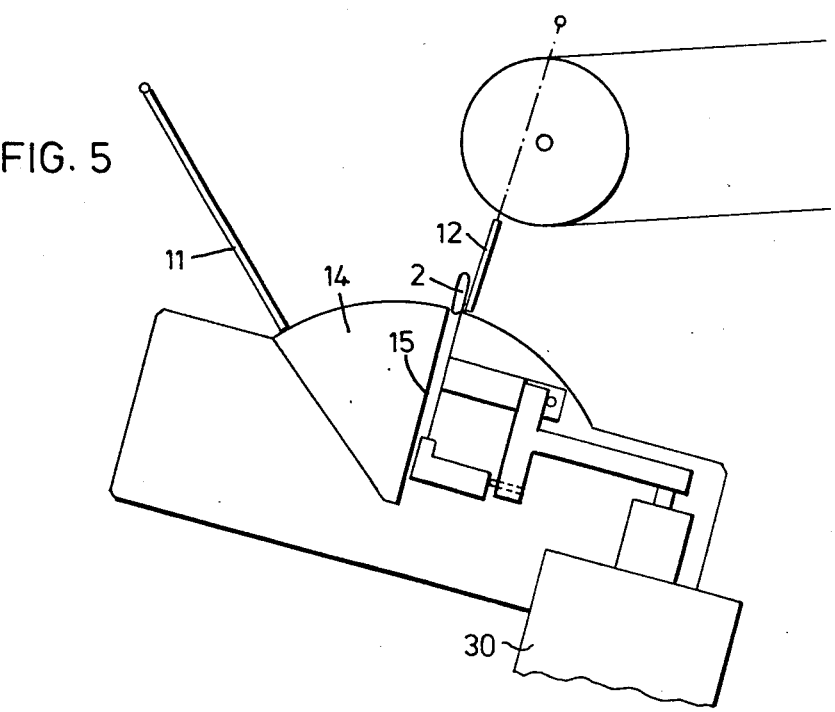
Figure 6:
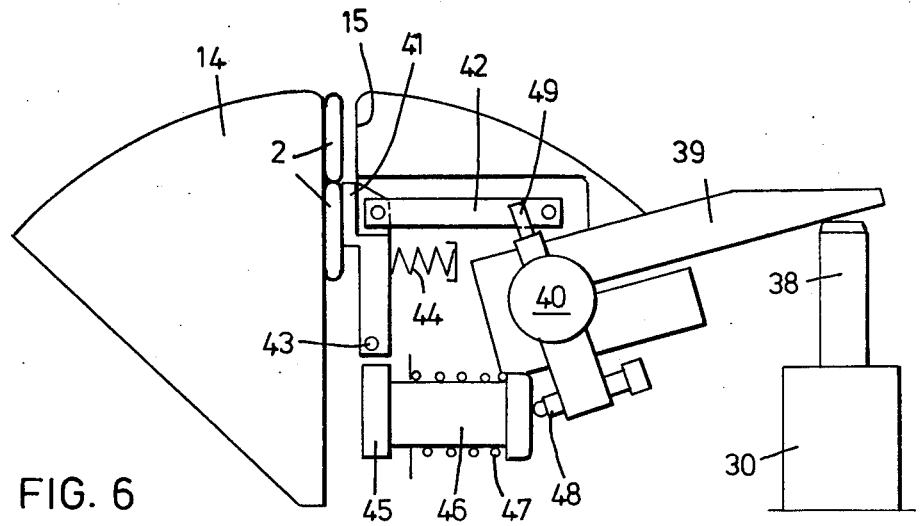
Figure 7:
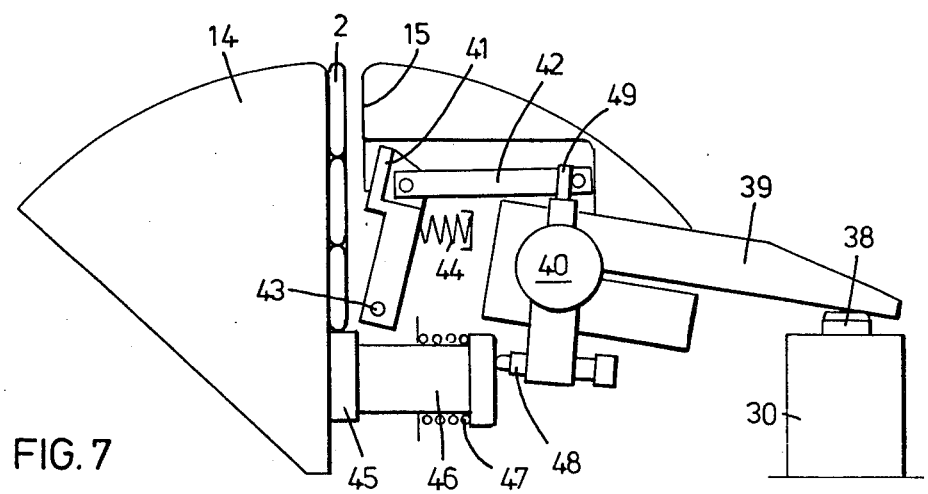
Figure 8:
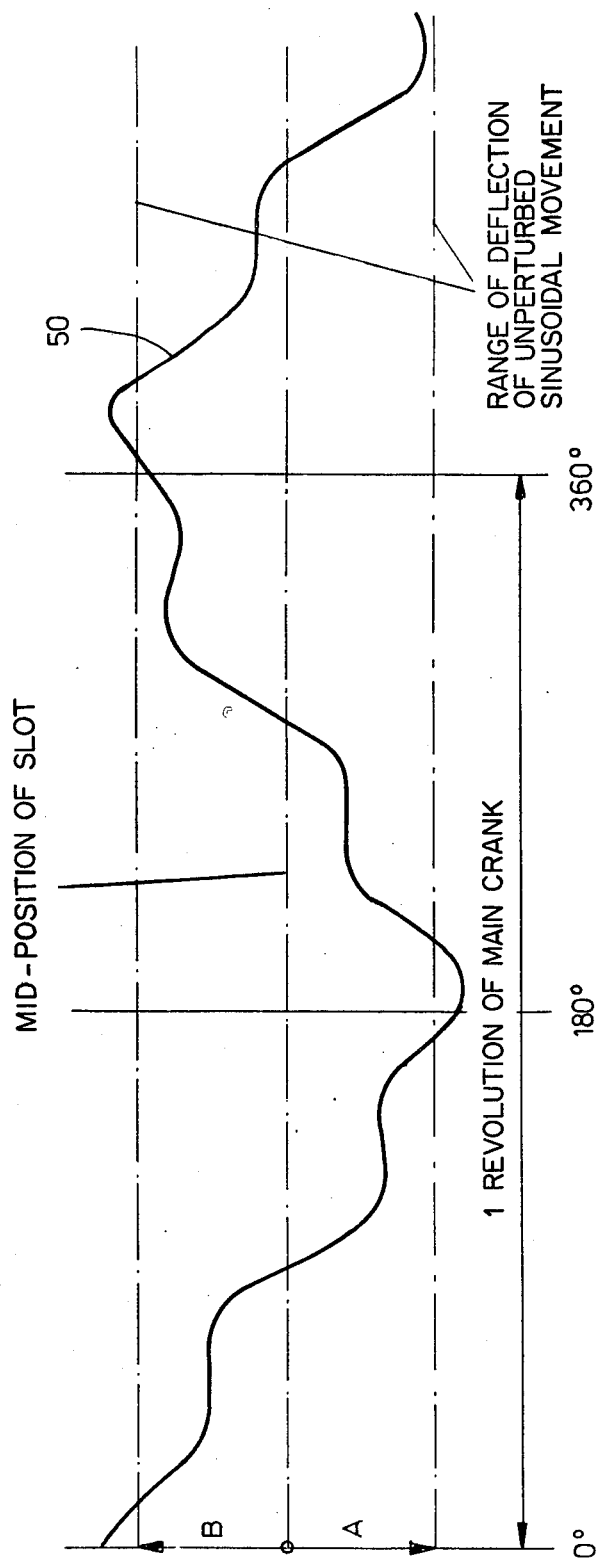

A preferred embodiment of the invention will now be described in detail with reference to the accompanying drawings, in which:

FIG. 1 is a perspective view of a cutaway portion of a dough-conveyor belt showing a flat piece of dough on which a small bar of chocolate has been placed, FIG. 2 is an elevation of the feeding device, FIG. 3 is a side elevation of the feeding device, partially in section taken on the line III—III of FIG. 2, FIGS. 4 and 5 are detail views from FIG. 2 showing a cylindrical-sector-shaped feeder part beneath a feed hopper in each of its two end positions, FIGS. 6 and 7 are elevations of a mechanism for blocking the small bars of chocolate in the feeder part, and FIG. 8 is a graph illustrating the path followed by a slot in the feeder part between its two end positions.

FIG. 1 shows a flat piece of dough 1 on which a small bar of chocolate 2 has been placed by the feeding device (not shown), the piece of dough 1 being carried by a conveyor belt 3. The bars of chocolate are placed on the pieces of dough at right angles to the conveyor belt.

The parts of the feeding device essential for explaining the embodiment of the invention are shown in FIG. 2. On the conveyor belt 3, passing around a first guide roller 4, the pieces of rolled-out dough are carried under the feeding device 5. A sensor unit 6 having a roller 7 resting on conveyor belt 3 detects the passage of a piece of dough and controls the feed of the chocolate bars. The chocolate bars are conveyed on a feed belt 9, passing around a second guide roller 8, to a hopper 10 intended to receive the chocolate bars. Walls 11 and 12 of hopper 10 are resiliently mounted by means of a tension spring 13 to prevent breakage of the bars of chocolate being moved around in hopper 10. Disposed beneath hopper 10 is a cylindrical-sector-shaped feeder part 14 provided with a slot 15 passing through it toward its longitudinal axis. Feeder part 14 forms the bottom of hopper 10 and is pivoted about its longitudinal axis 16.

As will now be described, feeder part 14 is driven in such a way that it executes a rotary movement beneath hopper 10, causing slot 15 to reciprocate between the two hopper walls 11 and 12. A drive motor 17 drives a crank assembly 19 via a first chain 18. A main crank 21, connected to a first drive wheel 20 driven by the first chain 18, actuates a connecting rod 22. The end of rod 22 opposite main crank 21 is connected to an eccentric pin 23 which, a second drive wheel 24, forms a supplementary, or auxiliary crank. A third drive wheel 25, disposed concentrically with the first drive wheel 20, drives a fourth drive wheel 27 via a chain 26, while a fifth drive wheel 28, disposed concentrically with wheel 27, drives supplementary crank 23, 24 via a chain 29. Drive wheels 25, 27, 28 and 24 form a transmission gear for the supplementary crank. Crank assembly 19 imparts a sinusoidal motion to cylindrical-sector-shaped feeder part 14, i.e., if it were not for supplementary crank 23, 24, slot 15 would execute a sinusoidal motion between its two end positions defined by the hopper walls as a function of the angle of rotation of main crank 21. The sinusoidal motion is perturbed by the rotating eccentric pin 23 at the upper end, as viewed in FIG. 2, of connecting rod 22, so that particularly in the end positions of the rotational travel, a course of movement is achieved which causes the small bars of chocolate to enter slot 15. Accordingly, the main sinusoidal movement of the feeder part 14 is effected by the crank assembly 19 which causes the feeder part 14 to be sinusoidally pivoted about its axis 16 so that the entrance to the slot 15 travels back and forth in a generally arcuate path between the walls 11 and 12. However, since the crank assembly 19 communicates with the feeder part 14 through the connecting rod 22 which is eccentrically connected to the second drive wheel 24, the second drive wheel 24 causes a second sinusoidal movement, which has a substantially shorter cycle, to be superimposed on the reciprocating movement of the connecting rod 22, so that a perturbed sinusoidal pivoting of the feeder part 14 about its axis 16 is achieved.

A lifting magnet 30 connected to feeder part 14 serves to actuate a mechanism 31 for blocking and releasing the bars of chocolate.

It may be seen from FIG. 3, which is a side elevation partially in section taken on the line III—III of FIG. 2, that the second drive wheel 24 is mounted on a shaft 32 in a bearing 33. Concentric drive wheels 27 and 28 are mounted on another shaft 34 in a bearing 35, while concentric drive wheels 20 and 25 are mounted on a shaft 36 in a bearing 37.

FIG. 4 and 5 show the cylindrical-sector-shaped feeder part 14 in its two end positions. In FIG. 4, slot 15 provided for the passage of chocolate bars 2 is seen in its position adjacent to the left-hand edge (wall 11) and in FIG. 5, adjacent to the right-hand edge (wall 12) of hopper 10, as viewed in FIGS. 4 and 5. Chocolate bars 2 are of oval cross-section and must be set upright in hopper 10 in order to be able to enter slot 15, i.e., the longer axis of the oval cross-section must be parallel to slot 15 and the longitudinal axis of the chocolate bar itself must be parallel to conveyor belt 3 (cf. FIG. 2). This upright positioning takes place primarily in the vicinity of hopper walls 11 and 12, so that the movement of feeder part 14 must exhibit a suitable time progression at those locations, as is achieved by means of supplementary crank 23, 24.

Mechanism 31 for blocking and releasing chocolate bars 2 in passage slot 15 is illustrated in FIGS. 6 and 7. A piston 38 of lifting magnet 30 acts upon an operating lever 39 pivoted about an axis 40. When piston 38 descends, lever 39 retracts an intermediate lever 42 pivoted on a clamping plate 41. In the feeding position (FIG. 6), clamping plate 41, pivoted about an axis 43, is pressed by a spring 44 against a chocolate bar 2, and the bar below the one being pressed upon drops down through slot 15 onto a piece of dough. In this feeding position, a cylinder 46 provided with a stop plate 45 is pressed away from slot 15, by means of a spring 47, toward an adjustable stop pin 48 connected to operating lever 39. In the blocking position (FIG. 7), an end pin 49 disposed on lever 39 moves lever 42 away from slot 15, thus pulling clamping plate 41 away from the slot as well. Stop pin 48 connected to lever 39 pushes cylinder 46 with stop plate 45 into slot 15, thereby blocking the feed of chocolate bars 2 to conveyor belt 3.

Feeding device 5 is controlled from sensor unit 6 (FIG. 2). When sensing roller 7 detects a piece of dough 1 on conveyor belt 3, clamping plate 41 is pressed against the second-lowest chocolate bar 2 in slot 15, stop plate 45 is retracted, and a chocolate bar thus drops, with its longitudinal axis perpendicular to the direction of travel of belt 3, onto a piece of dough. The prerequisite for a consistent and uninterrupted supply of chocolate bars to the pieces of dough is that after a bar 2 has been released to conveyor belt 3, when clamping plate 41 is retracted from slot 15 and stop plate 45 is pushed into slot 15, this slot must be filled with chocolate bars in such a way that by the time of the next release operation, there is at least one chocolate bar between stop plate 45 and clamping plate 41.

The curve in FIG. 8 represents the progress of slot 15 between hopper walls 11 and 12 as a function of the angle of rotation of main crank 21. The abscissa designated o corresponds to the mid-position of the slot between the hopper walls. The sections designated A and B on the y-axis corresponds to the maximum deflections of the slot during an unperturbed sinusoidal movement. As a result of the motion superimposed by supplementary crank 23, 24, the course of movement 50 shown in FIG. 8 is produced, the maxima of the unperturbed sinusoidal movement guarantees the faultless filling of slot 15 with chocolate bars contained in hopper 10; the bars enter slot 15 primarily in the vicinity of hopper walls 11 and 12 since there the maximum deflections are exceeded jerkingly, so to speak, through the perturbance of the sinusoidal course of movement.

What is claimed is:

1. A method of vertically orienting elongated first products for automatically feeding them to and positioning them on second products carried on a conveyor comprising positioning said first products in a receptacle disposed above said conveyor, said receptacle having a pair of spaced walls, the bottom of said receptacle being defined by a feeder part having a downwardly extending feeder opening therein, and moving said feeder part with perturbed sinusoidal motion so that said feeder opening travels back and forth substantially between said walls in perturbed sinusoidal motion to cause said first products to pass through said feeder opening and onto said second products.

2. The method of claim 1, wherein said movement is a sinusoidal movement imparted to said feeder part by a motor via a main crank assembly, comprising the further step of perturbing the course of said sinusoidal movement by means of a supplementary crank assembly.

3. The method according to claim 1, wherein said first products are alternately blocked in said feed opening and released through said feed opening by means controlled from a sensing device in responce to the passage beneath the feed opening of the second products on the conveyor belt.

4. The method according to claim 2, wherein said first products are alternately blocked in said feed opening and released through said feed opening by means controlled from a sensing device in response to the passage beneath the feed opening of the second products on the conveyor belt.

5. In the method of claim 1, said feeder part further characterized as a cylindrical sector-shaped feeder part, the arcuate cylindrical sector surface of said feeder part defining the bottom of said receptacle, said feeder opening extending through said arcuate surface, said feeder part pivoting substantially about the axis of said cylindrical sector in the movement thereof in said perturbed sinusoidal motion.

6. The method of claim 1 wherein said elongated first products are of generally oval-shaped cross section.

7. In the method of claim 1, at least one of said spaced receptacle walls being resiliently mounted.

* * * * *